United States Patent

Akeley

[15] 3,680,387
[45] Aug. 1, 1972

[54] DIFFERENTIAL PRESSURE TRANSDUCER

[72] Inventor: Lloyd T. Akeley, Fullerton, Calif.
[73] Assignee: Beckman Instruments, Inc.
[22] Filed: Dec. 2, 1970
[21] Appl. No.: 94,400

[52] U.S. Cl. .................. 73/398 R, 73/407 R, 336/30
[51] Int. Cl. .............................................. G01l 9/10
[58] Field of Search ............... 73/407, 398 R; 336/30

[56] References Cited

UNITED STATES PATENTS 3,534,612  10/1970  Buckland ................... 73/398 R

Primary Examiner—Donald O. Woodiel
Attorney—William F. McDonald and Robert J. Steinmeyer

[57] ABSTRACT

A differential pressure measuring transducer is disclosed which includes a substantially rigid housing. The housing has two opposed end faces, a first centrally disposed cavity in a first end face, a second centrally disposed cavity in a second end face, and a passage connecting the two cavities. A first pressure responsive diaphragm is disposed adjacent the first end face and sealed thereto along its periphery. A second pressure responsive diaphragm is disposed adjacent the second end face and sealed thereto along its periphery. A rod extends through the passage and engages at each end a respective diaphragm. A first armature plate is attached to the rod adjacent the first diaphragm and a second armature plate is attached to the rod adjacent the second diaphragm. A first core is positioned in the first cavity contiguous with the housing and spaced from the first armature. The core has a centrally disposed opening therein in alignment with the passage, through which the rod may slide. A second core is positioned in the second cavity contiguous with the housing and spaced from the second armature. The second core also has a centrally disposed opening therein in alignment with the passage, through which the rod may slide. A first primary and secondary inductive coil assembly is mounted in the first core and a second primary and secondary inductive coil assembly is mounted in the second core so that each armature and core assembly constitutes a transformer. Means are provided for connecting the core assemblies into a variable inductive measuring circuit which includes primary energizing means. As a result, when the rod moves in response to differing pressures being sensed by the two diaphragms, one armature moves toward one core and the other armature moves away from the other core. Different output voltages are induced in each secondary coil with the difference between the two voltages being proportional to and a measure of the pressure differential being sensed by the diaphragms.

12 Claims, 4 Drawing Figures

INVENTOR.
LLOYD T. AKELEY
BY William F. McDonald

INVENTOR.
LLOYD T. AKELEY
BY William F. McDonald

INVENTOR.
LLOYD T. AKELEY

DIFFERENTIAL PRESSURE TRANSDUCER

BACKGROUND OF THE INVENTION

The instant invention relates to a differential pressure transducer, in particular one which has variable inductive elements or transformer elements for use in an inductive or differential inductive measuring circuit wherein the induced voltage or the difference in the induced voltage is the output of the transducer.

Transducers or sensor gauges for differential pressure measuring utilizing the inductive principle are known. The prior art variable inductance transducers have suffered from requiring either a plurality of fill passages and internal and external diaphragm mounts or, in an attempt to overcome these problems, have resorted to a single centrally mounted sensing or measuring diaphragm. An example of such arrangements may be found in U.S. Pat. No. 3,277,719 to Prell. A typical earlier prior art approach may be found in U.S. Pat. No. 2,276,580 to Hofer.

The central measuring diaphragm approach wherein a flat sensing diaphragm deflects with pressure difference suffers because deflection is not a linear function of pressure and because the induced change in voltage is not necessarily a linear function of deflection. This limits operations to very small deflections if near linear performance is desired. When diaphragm thickness is used to control stiffness, and thus deflection, very close tolerances on thickness must be held. Also, the sensing diaphragm material must have a spring characteristic to minimize hysteresis and permanent offset with overrange.

SUMMARY OF THE INVENTION

It is an object of the instant invention to provide an improved differential pressure measuring transducer using a variable transformer or a variable inductance construction which does not depend upon a central measuring diaphragm. Advantageously, such a transducer will have improved linearity and reproducibility of measurement. The assembly will be simplified and the number of openings in the transducer housing for various connections will be substantially reduced.

The differential pressure measuring transducer of the instant invention includes a substantially rigid housing and two opposed end faces. A first centrally disposed cavity is in the first end face and a second centrally disposed cavity is in the second end face. A passage connects the two cavities. A first pressure responsive diaphragm is disposed adjacent the first end face and sealed thereto along its periphery. A second pressure responsive diaphragm is disposed adjacent the second end face and sealed thereto along its periphery. A rod extends through the passage and engages at each end a respective diaphragm. A first armature plate is attached to the rod adjacent the first diaphragm and a second armature plate is attached to the rod adjacent the second diaphragm. A first core is positioned in the first cavity contiguous with the housing and spaced from the first armature. The core has a centrally disposed opening therein in alignment with the passage, through which the rod may slide. A second core is positioned in the second cavity contiguous with the housing and spaced from the second armature. The second core also has a centrally disposed opening therein in alignment with the passage, through which the rod may slide. A first primary and secondary inductive coil assembly is mounted in the first core and a second primary and secondary inductive coil assembly is mounted in the second core so that each armature and core assembly constitutes a transformer. Means are provided for connecting the coil assemblies into a variable inductive measuring circuit including primary energizing means. When the rod moves in response to differing pressures being sensed by the two diaphragms, one armature moves toward one core and the other armature moves away from the other core. Thus differing output voltages are induced in each secondary coil, the difference between the two voltages being a measure of the pressure differential being sensed by the diaphragms.

If it is desired to fill the interior spaces of the transducer with fluid, the housing may have a fill passage therein for filling the space between the diaphragms and respective end faces, the cavities, the passage, the openings, and any other hollow spaces within the housing with fluid. Means can also be provided for sealing the fill passage.

Advantageously, a buffer disc may be provided between each armature and its respective core so that a cushion is provided between these parts under overrange conditions. Each diaphragm and its respective end face may also have matching contours with the diaphragm being designed to seat against the end face at a given pressure, whereby overrange protection is provided.

One end of the rod may engage one of the diaphragms by means of a cap attached to a spring which resiliently bears against the corresponding end face of the housing. This may be advantageous in some circumstances in that the spring will contribute to the stiffness of the system. The range of the transducer can then be changed simply by changing springs. In this case a sleeve may be provided around the other end of the rod to match the magnetic leakage and loss in the spring, thus minimizing quadrature to provide good linearity and resolution through null. Means may also be provided for adjusting the length of the rod between the armatures so as to adjust the spacing between an armature and its respective core at zero differential pressure. In this way the zero output can be precisely set. The other end of the rod may engage the other diaphragm by means of a second cap. A shoulder may be provided on each cap and a seat disposed on each end face for a shoulder to seat against under overrange conditions, whereby overrange protection is provided.

Cross passages may be provided in the housing to facilitate electrical connection between the coil assemblies and make possible the use of a single four-pin header unit. A side-by-side construction of each coil assembly may be used to provide high impedance, primary-to-secondary, and coil-to-ground.

Desirably, the two secondary coils may be connected bucking in the measuring circuit so that the output voltage from the instrument is the difference between the voltages induced in each secondary coil.

BRIEF DESCRIPTION OF THE DRAWING

Other objects and advantages of this invention will be apparent from the following description taken in conjunction with the accompanying drawings.

DETAILED DESCRIPTION

Figure 1:
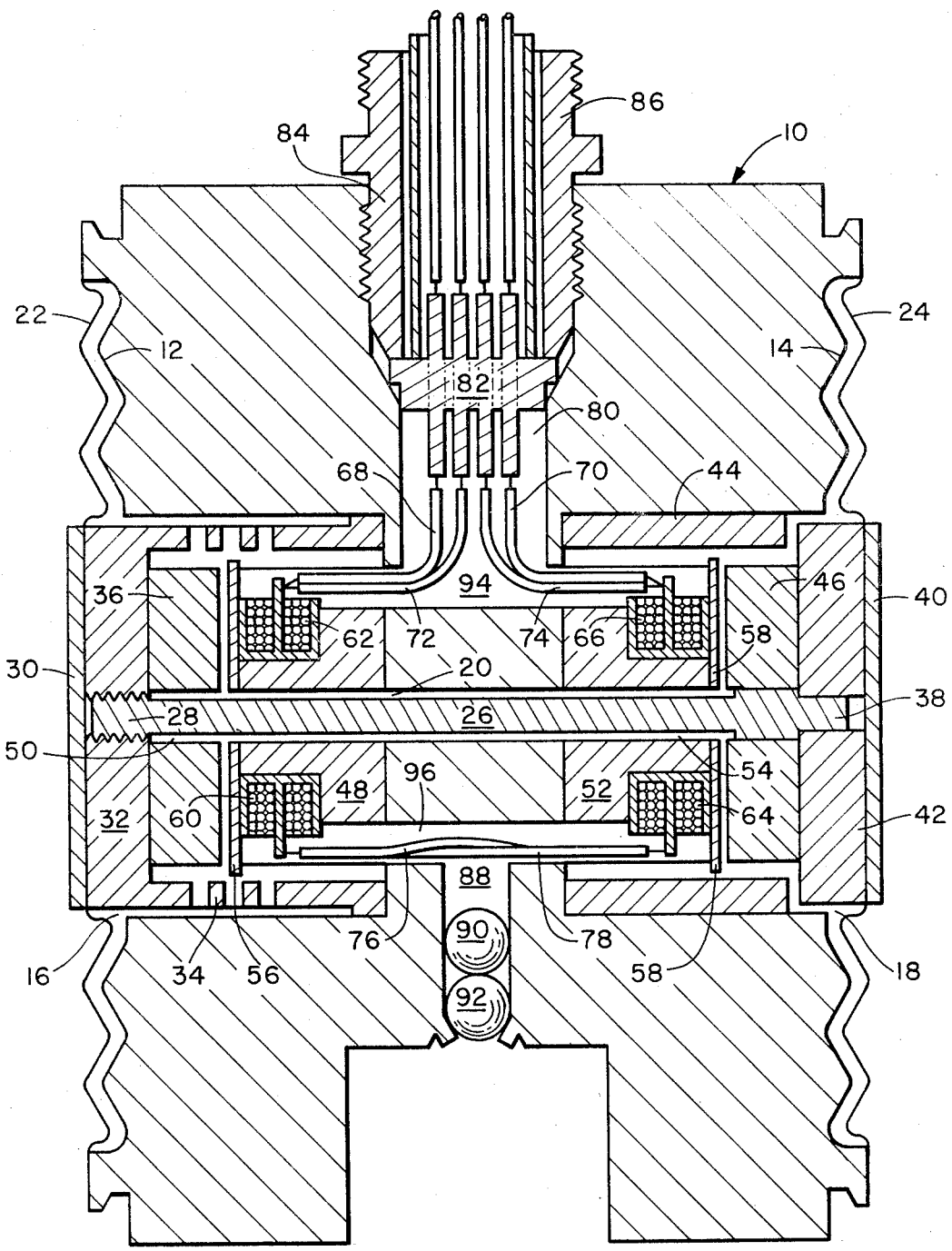
FIG. 1 is a sectional view, with some parts removed for purposes of clarity, of a differential pressure measuring transducer according to the instant invention.

Referring now to FIG. 1, the differential pressure measuring transducer may be seen to include a substantially rigid housing indicated generally at 10. Housing 10 may be of any appropriate shape but conveniently is cylindrical. Housing 10 has two opposed end faces, 12 and 14. A first centrally disposed cavity 16 is provided in first end face 12 and a second centrally disposed cavity 18 is provided in second end face 14. Passage 20 connects the two cavities. A first pressure responsive diaphragm 22 is disposed adjacent first end face 12 and sealed thereto along its periphery in any appropriate manner, as by welding. A second pressure responsive diaphragm is disposed adjacent second end face 14 and sealed thereto along its periphery, for example in a similar manner. As shown, each diaphragm 22, 24 and its respective end face 12, 14, have matching contours and each diaphragm is designed to seat against its end face at a given pressure thus providing overrange protection for the device. Rod 26 extends through passage 20 and engages at each end a respective diaphragm 22, 24. As shown, end 28 of rod 26 engages diaphragm 22 at first stiffening disc 30 by means of a cap 32 attached to a spring 34 which resiliently bears against the end face 12 of housing 10 in first cavity 16. Diaphragm 22 is clamped between stiffening disc 30 and cap 32.

A first armature plate 36, for example of sintered iron powder, is attached to rod 26 adjacent first diaphragm 22. As shown, this is accomplished through the first armature 26 being attached to cap 32.

The other end 38 of rod 26 is attached to second diaphragm 24 at second stiffening disc 40 by means of a second cap 42. Sleeve 44 peripherally disposed around second cavity 18 matches the magnetic leakage of spring 34 to minimize quadrature in the output signal to provide good resolution and linearity through null. A second armature plate 46, similar to first armature plate 36, is attached to rod 26 adjacent second diaphragm 24 through cap 42.

A first core 48 is positioned in first cavity 16 contiguous with housing 10 at its inner face and spaced from first armature 36. First core 48 has a centrally disposed opening 50 in alignment with passage 20, through which rod 26 may slide.

A second core 52 is similarly positioned in second cavity 18 contiguous at its inner face with housing 10 and spaced from second armature 46. A second opening 54 similar to first opening 50 is provided centrally disposed in second core 52 in alignment with passage 20 trough which rod 26 may slide. As shown, first and second buffer discs 56 and 58 of a suitable material such as polytetrafluoroethylene are positioned between each armature 36, 46, and its respective core, 48, 52 so that a cushion is provided between these parts under overrange conditions. This will prevent possible chipping or fracture of the parts. A first primary 60 and secondary 62 coil assembly is mounted in first core 48. A second primary 64 and secondary 66 inductive coil assembly is similarly mounted in the second core 52. Thus, each armature 36, 46, and its respective cores, 46, 52 and coils 60, 62, and 64, 66, constitutes a transformer. The side-by-side coil assembly constructions shown, i.e. the primary coil and secondary coil of each assembly are positioned side-by-side, provide high impedance, primary-to-secondary, and coil-to-ground.

End 28 of rod 26 is shown threadably engaged with cap 32 to provide means for adjusting the length of rod 26 between armatures 36 and 46 and their respective cores, 48, 52. The length of the rod would normally be adjusted during assembly of the transducer to precisely set the spacing between an armature and core assembly e.g., armature 46 and core 52, at zero differential pressure. Means such as electrical leads 68, 70, 72, 74, 76, and 78 are provided to connect the coil assemblies together into a variable inductance measuring circuit (not shown). Four electrical leads 68, 70, 72, and 74 come out through housing 10 by means of a passage 80 and pass through four-pin electrical header 82. A plug 84 at the end of a conduit 86 threadably engaged with housing 10 supports header 82 against internal pressure and due to the tapering of passage 80 seals header 82 to housing 10. Cross-passages 94 and 96 facilitate electrical connection between the coil assemblies and make possible the use of a single four-pin header unit 82.

A fill passage 88 is provided in housing 10 for filling the interior space thereof, i.e. the space between the diaphragms 22, 24, and respective end faces 12, 14, the cavities, 16, 18, the passage 20, the openings 50, 54, and all other hollow spaces, such as the interior part of passage 80, within the housing with an appropriate fluid such as insulating oil. The fluid preferably is essentially noncompressible and has the desired electrical insulating and dielectric properties and proper damping characteristics. Means such as a ball 90 pressure fitted into tapered fill passage 88 may be utilized to seal fill passage 88 when the interior of housing 10 has been filled. A second ball 92 may be stacked into fill passage 88 behind ball 90 to provide a backup force.

Figure 2:
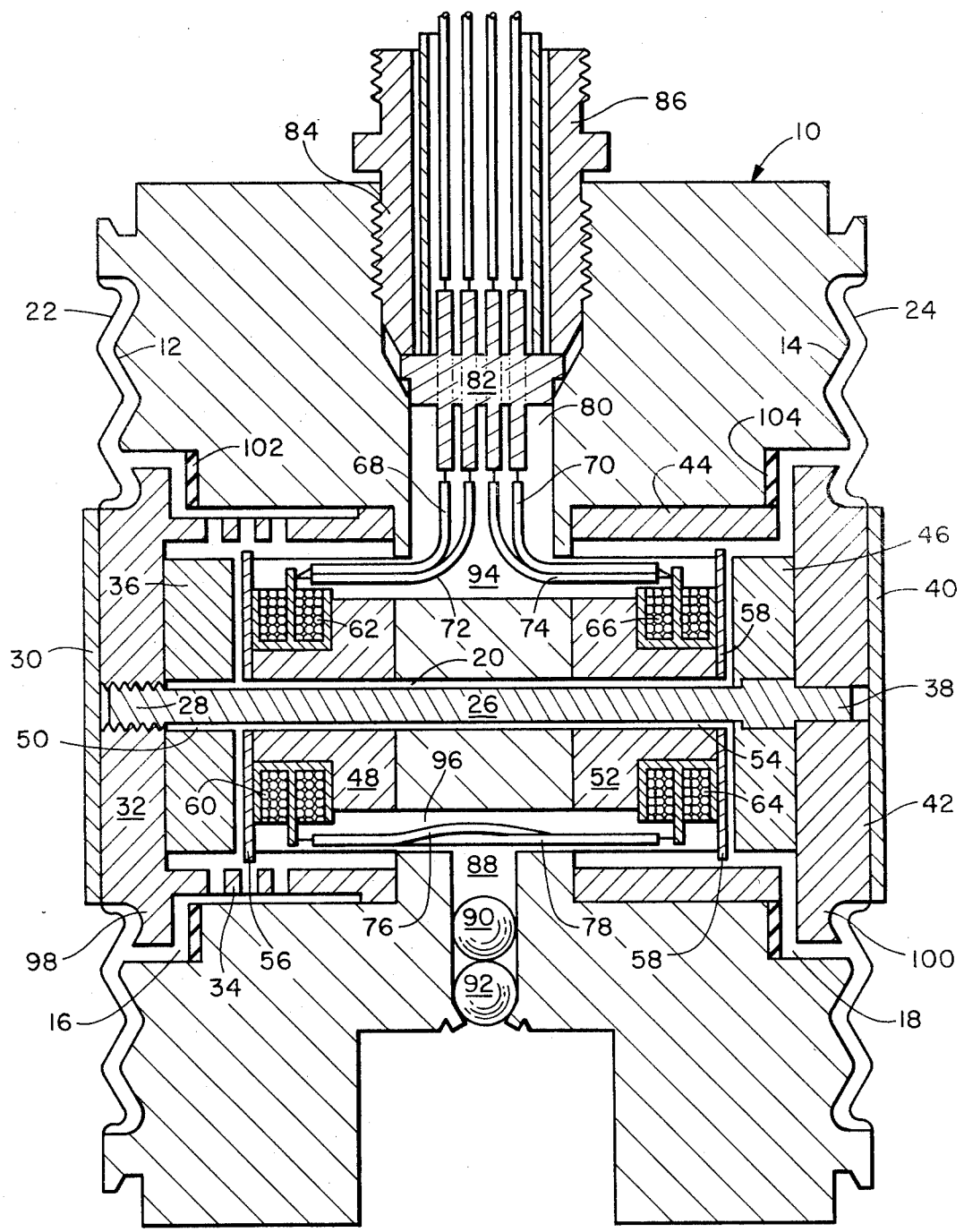
FIG. 2 is similar to FIG. 1, showing an alternate embodiment of a differential pressure measuring transducer according to the instant invention.

FIG. 2 is similar to FIG. 1, but shows an alternate arrangement for providing overrange protection. Shoulders 98 and 100 are provided on caps 32 and 42 respectively. A first seat, e.g. seal ring 102, is provided on end face 12 and a second seat, e.g. seal ring 104, is provided on end face 14. Under overrange conditions, the appropriate shoulder, 98 or 100, will seat against its respective seal ring, 102 and 104, thus shutting off the flow of fluid from under its diaphragm, 22 or 24, providing overrange protection.

Figure 3:
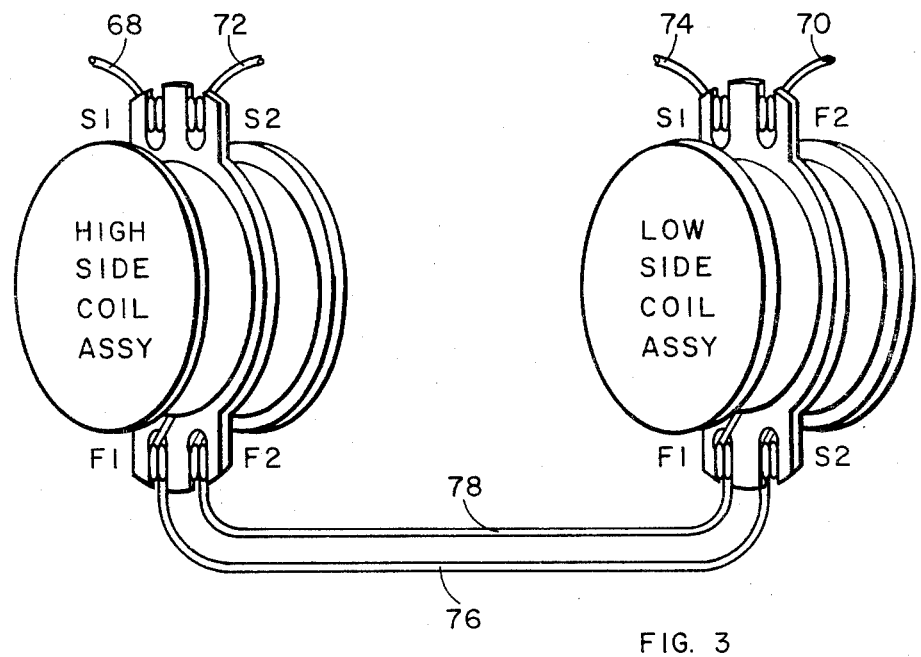
FIG. 3 is a connection diagram showing the manner in which the coils are connected according to the instant invention.
Figure 4:
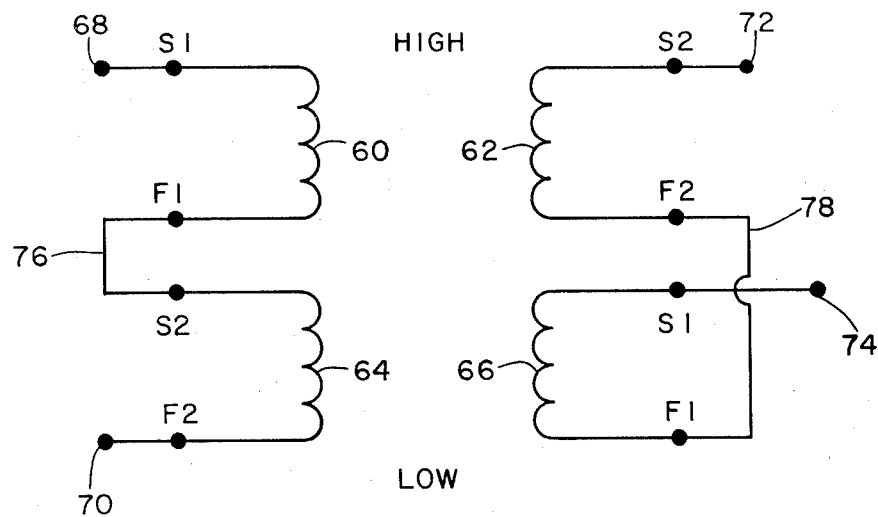
FIG. 4 is a schematic diagram showing the wiring of the coils according to the instant invention.

Referring to FIGS. 3 and 4, the four windings of the two transformers of the transducer may be connected into any appropriate variable transformer or variable inductance measuring circuit. A suitable electrical power source not shown is connected across lead 68 connected to the high side primary coil at $S_1$ and lead 70 connected to the low side primary coil at $F_2$. Lead 76 extends between $F_1$ of the high side primary coil 60 and $S_2$ of the low side primary coil 64. The high side secondary coil 62 is connected to the low side secondary coil 66 by lead 78 extending between $F_2$ on the high side coil 62 and $F_1$ on low side coil 66. As shown, the two secondary coils 62 and 66 are connected bucking. Electrical lead 72 is connected to high side secondary 62 at $S_2$ and electrical lead 74 is connected to low side secondary 66 at $S_1$. FIG. 4 is a schematic diagram of the resulting circuitry.

Referring to FIGS. 3 and 4 it may be seen that there is a fixed excitation from the primary coils 60 and 64. These produce a magnetomotive force which, with a given gap between each armature 36, 46, and core 48, 52 assembly, produces a given flux. As the gaps vary due to the movement of rod 26 in response to differing pressures being sensed by the two diaphragms 22 and 24 causing one armature for example 36 to move toward core 48 and the other armature 46 to move away from core 52, the flux in the two magnetic circuits varies and the voltage on the secondary coils 62 and 66 varies. Since the secondary coils 62 and 66 are connected bucking, the output voltage across lines 72 and 74 is equal to the difference in the induced voltages on the two secondary coils 62 and 66. The change in output voltage is proportional to the change in differential pressure. This voltage differential is a measure of the pressure differential being sensed by diaphragms 22 and 24. Any difference in pressure on the two diaphragms 22 and 24 will cause the diaphragms to deflect toward the lower pressure.

It will be appreciated that the foregoing is a description of exemplary embodiments of the instant invention. This is for illustrative purposes only and the instant invention is not to be limited thereby, but only by the claims wherein what is claimed is:

1. A differential pressure measuring transducer comprising:
   a. a substantially rigid housing having two opposed end faces, a first centrally disposed cavity in a first end face, a second centrally disposed cavity in a second end face, and a passage connecting the two cavities;
   b. a first pressure responsive diaphragm disposed adjacent the first end face and sealed thereto along its periphery;
   c. a second pressure responsive diaphragm disposed adjacent the second end face and sealed thereto along its periphery;
   d. a rod extending through the passage and engaging at each end a respective diaphragm;
   e. a first armature plate attached to the rod adjacent the first diaphragm;
   f. a second armature plate attached to the rod adjacent the second diaphragm;
   g. a first core positioned in the first cavity contiguous with the housing and spaced from the first armature and having a centrally disposed opening therein in alignment with the passage, through which the rod may slide;
   h. a second core positioned in the second cavity, contiguous with the housing and spaced from the second armature and having a centrally disposed opening therein is alignment with the passage, through which the rod may slide;
   i. a first primary and secondary inductive coil assembly mounted in the first core;
   j. a second primary and secondary inductive coil assembly mounted in the second core so that each armature and core assembly constitutes a transformer; and
   k. means for connecting the coil assemblies into a variable inductance measuring circuit including primary energizing means so that when the rod moves in response to differing pressures being sensed by the two diaphragms, one armature moves toward one core and the other armature moves away from the other core, whereby differing output voltages are induced in each secondary coil, the difference between the two voltages being a measure of the pressure differential being sensed by the diaphragms.

2. The transducer of claim 1 wherein the housing has a fill passage therein for filling the space between the diaphragms and their respective end faces, the cavities, the passage, the openings, and any other hollow spaces within the housing with fluid.

3. The transducer of claim 2 including means for sealing the fill passage.

4. The transducer of claim 1 including a buffer disc between each armature and its respective core so that a cushion is provided between these parts under overrange conditions.

5. The transducer of claim 1 wherein one end of the rod engages one diaphragm by means of a cap attached to a spring which resiliently bears against the corresponding end face of the housing.

6. The transducer of claim 5 wherein a sleeve is peripherally disposed in the cavity around the other end of the rod to match the magnetic leakage of the spring, whereby quadrature in the output voltages is minimized.

7. The transducer of claim 6 wherein the other end of the rod engages the other diaphragm by means of a second cap and including a shoulder on each cap and a seat disposed on each end face for a shoulder to seat against under overrange conditions, whereby overrange protection is provided.

8. The transducer of claim 1 wherein each diaphragm and its respective end face have matching contours and the diaphragm is designed to seat against the end face at a given pressure, whereby overrange protection is provided.

9. The transducer of claim 1 including means for adjusting the length of the rod between the armatures so as to adjust the spacing between an armature and its respective core at zero differential pressure.

10. The transducer of claim 1 wherein the two secondary coils are connected bucking in the measuring circuit whereby the output voltage is the difference between the voltages induced in each secondary coil.

11. The transducer of claim 1 wherein cross-passages are provided between the coil assemblies so that electrical connection is facilitated.

12. The transducer of claim 1 wherein the primary coil and secondary coil of each assembly are positioned side-by-side, whereby high impedance is provided.

* * * * *